United States Patent
Kang et al.

(10) Patent No.: US 9,509,388 B2
(45) Date of Patent: Nov. 29, 2016

(54) METHOD AND APPARATUS FOR CHANNEL INFORMATION FEEDBACK IN A WIRELESS COMMUNICATION SYSTEM

(71) Applicant: LG ELECTRONICS INC., Seoul (KR)

(72) Inventors: Ji Won Kang, Anyang-si (KR); Ki Tae Kim, Anyang-si (KR); Su Nam Kim, Anyang-si (KR); Sung Ho Park, Anyang-si (KR); Jin Young Chun, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 73 days.

(21) Appl. No.: 14/346,721

(22) PCT Filed: Sep. 21, 2012

(86) PCT No.: PCT/KR2012/007596
§ 371 (c)(1),
(2) Date: Mar. 22, 2014

(87) PCT Pub. No.: WO2013/042987
PCT Pub. Date: Mar. 28, 2013

(65) Prior Publication Data
US 2014/0226611 A1    Aug. 14, 2014

Related U.S. Application Data

(60) Provisional application No. 61/538,135, filed on Sep. 23, 2011.

(51) Int. Cl.
| | | |
|---|---|---|
| *H04W 4/00* | (2009.01) | |
| *H04B 7/06* | (2006.01) | |
| *H04B 7/04* | (2006.01) | |
| *H04L 5/00* | (2006.01) | |
| *H04L 25/02* | (2006.01) | |

(52) U.S. Cl.
CPC .......... *H04B 7/0626* (2013.01); *H04B 7/0417* (2013.01); *H04B 7/0639* (2013.01); *H04L 5/0048* (2013.01); *H04L 25/0226* (2013.01)

(58) Field of Classification Search
None
See application file for complete search history.

(56) References Cited

U.S. PATENT DOCUMENTS

| | | | |
|---|---|---|---|
| 2011/0128939 A1 | 6/2011 | Lim et al. | |
| 2011/0170435 A1 | 7/2011 | Kim et al. | |
| 2012/0069926 A1 | 3/2012 | Park et al. | |
| 2012/0082248 A1* | 4/2012 | Han | H04B 7/0413 375/259 |
| 2012/0264441 A1* | 10/2012 | Chandrasekhar | H04L 5/0073 455/450 |
| 2012/0314806 A1 | 12/2012 | Kang et al. | |
| 2013/0336152 A1* | 12/2013 | Zhu | H04B 15/00 370/252 |

FOREIGN PATENT DOCUMENTS

| | | |
|---|---|---|
| KR | 10-2010-0091518 A | 8/2010 |
| KR | 10-2010-0133883 A | 12/2010 |
| KR | 10-2011-0061666 A | 6/2011 |
| KR | 10-2011-0069665 A | 6/2011 |

OTHER PUBLICATIONS

CATT, "CSI feedback for geographically-seperated antennas", 3GPP TSG RAN WG1 Meeting #66, R1-112116, Athens, Greece, Aug. 22-26, 2011.
Pantech, "Enhance MIMO operation for low power node RRH", 3GPP TSG RAN1 #66, R1-112286, Athens, Greece, Aug. 22-26, 2011.

* cited by examiner

*Primary Examiner* — Kouroush Mohebbi
(74) *Attorney, Agent, or Firm* — Birch, Stewart, Kolasch & Birch, LLP

(57) ABSTRACT

Provided are a method and apparatus for channel information feedback in a wireless communication system. A terminal may receive CSI-RS configuration information from a base station and generate channel information using a codebook determined in accordance with the number of CSI-RS patterns set by the CSI-RS configuration information. The base station may transmit CSI-RS patterns allocated to a plurality of nodes through a method for expanding a field within one control message.

12 Claims, 13 Drawing Sheets

METHOD AND APPARATUS FOR CHANNEL INFORMATION FEEDBACK IN A WIRELESS COMMUNICATION SYSTEM

CROSS REFERENCE TO RELATED APPLICATIONS

This application is the National Phase of PCT/KR2012/007596 filed on Sep. 21, 2012, which claims priority under 35 U.S.C. 119(e) to U.S. Provisional Application No. 61/538,135 filed on Sep. 23, 2011, all of which are hereby expressly incorporated by reference into the present application.

BACKGROUND OF THE INVENTION

Field of the Invention

The present invention concerns wireless communications, and more specifically, to a method and apparatus of feeding back channel information in a wireless communication system.

Related Art

Next-generation multimedia wireless communication systems that have been recently actively being researched demand capability of processing and sending various types of information such as radio data and images as depart from voice-centered services that were presented earlier. 4rth generation wireless communication which is a successor of 3d generation wireless communication aims to support a high-speed data service up to a 1 Gbps (gigabits per second) downlink and a 500 Mbps (megabits per second) uplink. An object of the wireless communication system is to provide reliable communication regardless of the location and mobility of multiple users. However, wireless channels suffer from abnormal nature that arises from path loss, noise, multipath fading, inter-symbol interference, and Doppler effect due to the UE's mobility. Various techniques are on development so as to overcome the abnormal nature of wireless channel and raise reliability of wireless communication.

Meanwhile, as M2M (machine-to-machine) communication is introduced and various devices such as smartphones or tablet PCs are introduced and spread, the amount of data demanded over a cellular network is being quickly increased. To meet high data demand, various technologies are being introduced. Carrier aggregation (CA) and cognitive ratio (CR) technique for efficient use of more frequency bands are now in research. Further, multi-antenna technique and multi-base station cooperative technology for boosting up data capacity in a limited frequency band are being studied. Wireless communication systems are forecast to have higher node density. A wireless communication system having higher node density may enjoy enhanced performance thanks to inter-node cooperation. That is, a wireless communication system where each node is cooperative with others may present much better performance than a wireless communication system does in which each node operates as an independent base station (BS; base station), ABS (advanced BS), Node-B (NB), eNode-B (eNB), AP (access point).

In order to enhance the performance of a wireless communication system, a distributed multi-node system (DMNS, hereinafter, "multi-node system") may apply where there are a plurality of nodes in a cell. The multi-node system may contain a distributed antenna system (DAS), a radio remote head (RRH) or the like. Further, standardization is now underway to apply various MIMO (multiple-input multiple-output) schemes and cooperative communication schemes, which have been already developed or are supposed to apply in the future, to the multi-node system.

Coordinated multipoint transmission and reception (CoMP) may apply to the multi-node system. Applying CoMP to a multi-cell multi-node system may lead to reduced inter-cell interference, and applying CoMP to a single cell multi-node system may result in reduced intra-cell inter-point interference.

As examples of CoMP, there are a JP (joint processing) scheme in which data on a UE is transmitted, shared by a plurality of nodes, and a CS (coordinated scheduling/beamforming) scheme in which data on a UE is transmitted by a single node that cooperates with other nodes through the other nodes' scheduling or a method of forming a transmission beam for reducing interference.

There is a need for a method of a UE efficiently measuring, generating, and feeding back channel information in a multi-node system.

SUMMARY OF THE INVENTION

An object of the present invention is to provide a method and apparatus of measuring, generating, and feeding back channel information in a wireless communication system.

In an aspect, there is provided a method of feeding back channel information by a UE (user equipment) in a wireless communication system. The method comprises receiving CSI-RS configuration information from a base station, the CSI-RS configuration information configuring channel state information and a reference signal (RS); determining the number of CSI-RS patterns configured by the CSI-RS configuration information; and generating channel information using a codebook determined depending on the number of the determined CSI-RS patterns.

In another aspect, there is provided a method of feeding back channel information by a UE (user equipment) in a wireless communication system. The method comprises receiving CSI-RS configuration information from a base station, the CSI-RS configuration information configuring a channel state information (CSI) reference signal (RS), wherein the CSI-RS configuration information includes split information on antenna ports for one CSI-RS pattern; and generating channel information using a codebook determined depending on the split information.

In still another aspect, there is provided a UE (user equipment) generating and feeding back channel information in a wireless communication system. The UE comprises an RF (radio frequency) unit transmitting or receiving a radio signal; and a processor connected with the RF unit, wherein the processor receives CSI-RS configuration information from a base station, the CSI-RS configuration information configuring a channel state information (CSI) reference signal (RS), determines the number of CSI-RS patterns configured by the CSI-RS configuration information, and generates channel information using a codebook determined depending on the determined number of CSI-RS patterns.

In a multi-node system, channel information may be efficiently measured, generated, and fed back.

DESCRIPTION OF EXEMPLARY EMBODIMENTS

The technologies to be described below may be used for various wireless communication systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access). CDMA may be implemented in the radio technology such as UTRA (Universal Terrestrial Radio Access) or CDMA2000. TDMA may be implemented in the radio technology such as GSM (Global System for Mobile communications)/GPRS (General Packet Radio Service)/EDGE (Enhanced Data Rates for GSM Evolution). OFDMA may be implemented in the radio technology such as IEEE 802.11 (Wi-Fi), IEEE 802.16 (WiMAX), IEEE 802-20, E-UTRA (Evolved UTRA). IEEE 802.16m is the evolution of IEEE 802.16e and provides backward compatibility with a system based on IEEE 802.16e. UTRA is part of UMTS (Universal Mobile Telecommunications System). 3GPP (3rd Generation Partnership Project) LTE (Long Term Evolution) is part of E-UMTS (Evolved UMTS) using E-UTRA (Evolved-UMTS Terrestrial Radio Access) and adopts OFDMA for downlink and SC-FDMA for uplink. LTE-A (Advanced) is the evolution of 3GPP LTE.

For clarity of description, LTE-A is primarily described, but the present invention is not limited thereto.

Figure 1:
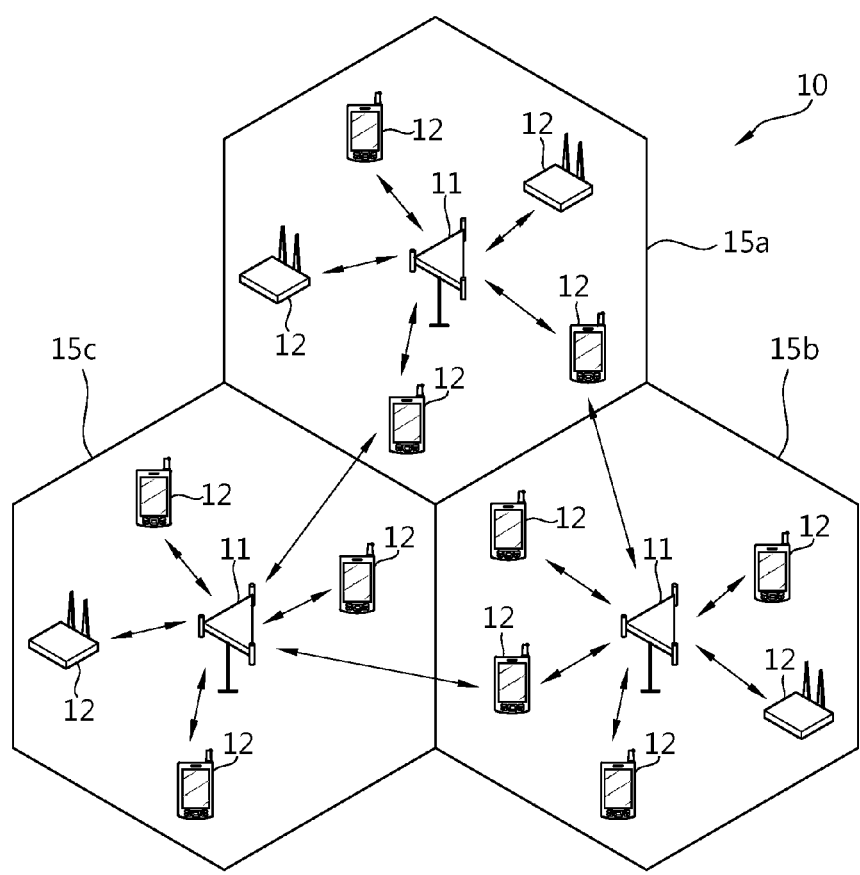
FIG. 1 shows a wireless communication system.

FIG. 1 shows a wireless communication system.

The wireless communication system 10 includes at least one base station (BS) 11. Each base station 11 provides a communication service over a specific geographical region (which is generally referred to as a "cell") 15*a*, 15*b*, or 15*c*. The cell may be divided into a plurality of regions (which are called "sectors"). A user equipment (UE) 12 may be stationary or have mobility, and may be also referred to by other terms, such as MS (Mobile Station), MT (Mobile Terminal), UT (User Terminal), SS (Subscriber Station), wireless device, PDA (Personal Digital Assistant), wireless modem, or handheld device. The base station 11 generally refers to a fixed station which communicates with the user equipment 12 and may be also referred to by other terms, such as eNB (evolved-NodeB), BTS (Base Transceiver System), or access point.

A user equipment generally belongs to a cell. The cell to which the user equipment belongs to is called a "serving cell". A base station which provides a communication service to the serving cell is called a "serving BS". Since the wireless communication system is a cellular system, another cell adjacent to the serving cell is present. The cell adjacent to the serving cell is called a "neighbor cell". A base station which provides a communication service to the neighbor cell is called a "neighbor BS". The serving cell and the neighbor cell are relatively determined with respect to the UE.

This technique may be used on downlink or uplink. In general, downlink refers to communication from the base station 11 to the user equipment 12, and uplink refers to communication from the user equipment 12 to the base station 11. On downlink, the transmitter is part of the base station 11, and the receiver may be part of the UE 12. On uplink, the transmitter may be part of the UE 12, and the receiver may be part of the base station 11.

The wireless communication system may be one of a MIMO (Multiple-In Multiple-Out) system, a MISO (Multiple Input Single Output) system, a SISO (single input single output) system, and a SIMO (single input multiple output) system. The MIMO system uses multiple transmit antennas and multiple receive antennas. The MISO system uses multiple transmit antennas and a single receive antenna. The SISO system uses a single transmit antenna and a single receive antenna. The SIMO system uses a single transmit antenna and multiple receive antennas. Hereinafter, the transmit antenna refers to a physical or logical antenna that is used for transmitting a signal or stream, and the receive antenna refers to a physical or logical antenna that is used for receiving a signal or stream.

Figure 2:
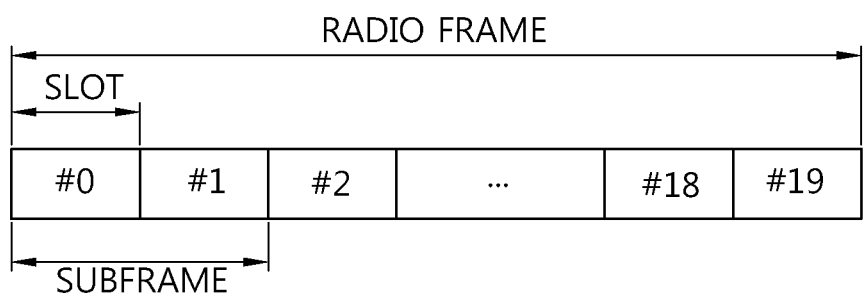
FIG. 2 shows the architecture of a 3GPP LTE radio frame.

FIG. 2 illustrates a structure of a radio frame in 3GPP LTE.

Refer to Ch. 5, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)". Referring to FIG. 2, the radio frame includes 10 subframes, each of which includes two slots. The slots in the radio frame are numbered from #0 to #19. Time taken for a subframe to be transmitted is referred to as a TTI (Transmission Time Interval). The TTI may be a scheduling unit for data transmission. For example, the length of a radio frame is 10 ms, the length of a subframe is 1 ms, and the length of a slot is 0.5 ms.

One slot includes a plurality of OFDM (Orthogonal Frequency Division Multiplexing) symbols in the time domain and includes a plurality of subcarriers in the frequency domain. The OFDM symbol represents a symbol period since 3GPP LTE uses OFDMA on downlink, and thus, the OFDM symbol may be called by other names depending on multiple access schemes. For example, the OFDM symbol may be called SC-FDMA symbol when SC-FDMA (single carrier-frequency division multiple access) is used for an uplink multiple access scheme. The resource block is a basis for resource allocation and includes, in one slot, a plurality of consecutive sub-carriers. The architecture of a radio frame is merely an example, and the number of subframes included in the radio frame or the number of slots included in a subframe, and the number of OFDM symbols included in a slot may change in various ways.

3GPP LTE defines that in normal cyclic prefix (CP) one slot includes seven OFDM symbols and that in the extended CP one slot includes six OFDM symbols.

The wireless communication system is generally divided into an FDD (frequency division duplex) type and a TDD (time division duplex) type. In FDD, uplink transmission and downlink transmission are performed in different frequency bands, respectively. In TDD, uplink transmission and downlink transmission are performed at different times, respectively, in the same frequency band. In the TDD type, channel responses are substantially reciprocal. This means that in a given frequency range, a downlink channel response is substantially the same as an uplink channel response. Accordingly, in a TDD-based wireless communication system, a downlink channel response may be advantageously obtained from an uplink channel response. In the TDD type, the entire frequency band is time-divided for uplink transmission and downlink transmission, so that downlink transmission by a base station cannot be performed simultaneously with uplink transmission by a UE. In a TDD system where uplink transmission and downlink transmission are distinct from each other on a per-subframe basis, uplink transmission and downlink transmission are conducted on different subframes.

Figure 3:
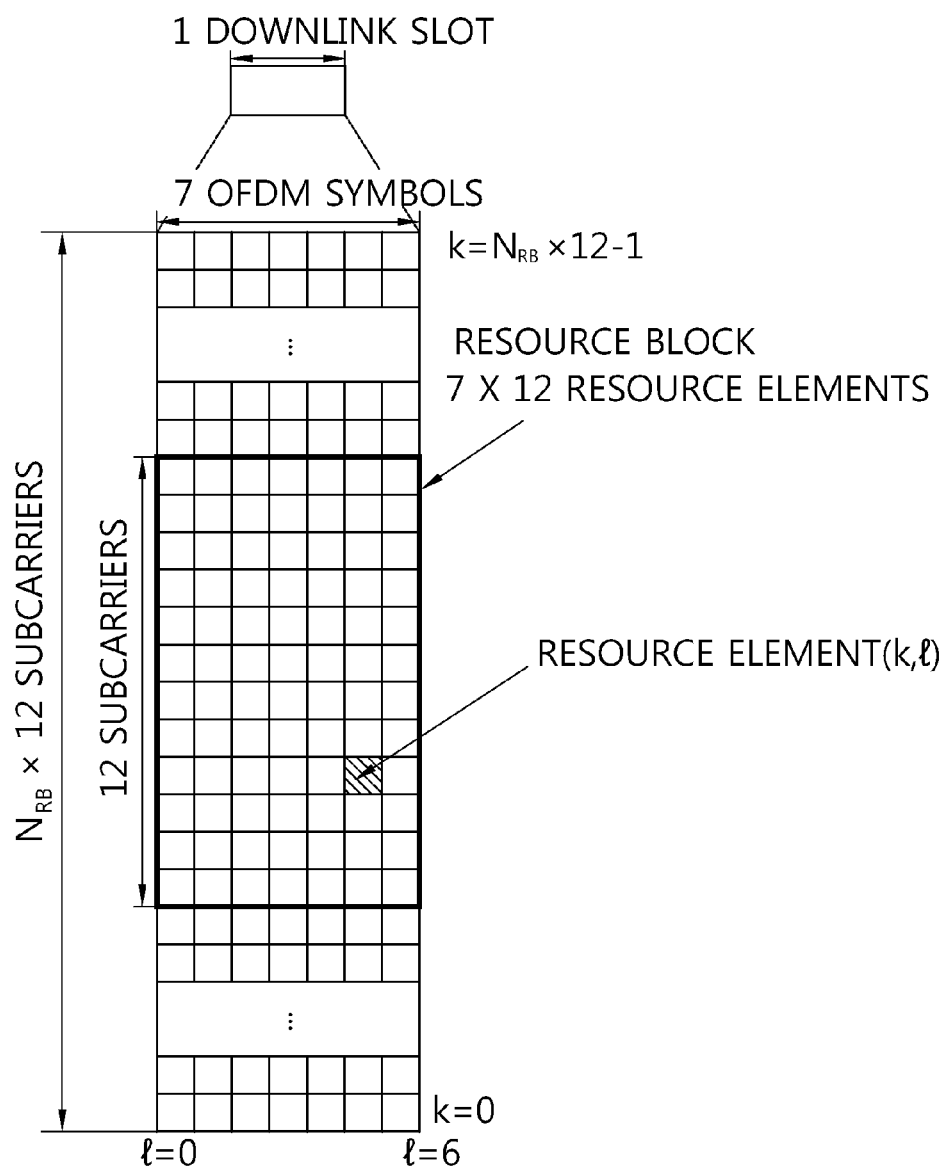
FIG. 3 shows an example resource grid for one downlink slot.

FIG. 3 shows an example resource grid for one downlink slot.

The downlink slot includes a plurality of OFDM symbols in the time domain and includes $N_{RB}$ resource blocks in the frequency domain. The number, $N_{RB}$, of resource blocks contained in the downlink slot depends upon a downlink transmission bandwidth configured in a cell. For example, in an LTE system, $N_{RB}$ may be any one between 6 and 110. One resource block contains a plurality of sub-carriers in the frequency domain. The architecture of an uplink slot may also be the same as the downlink slot.

Each element on the resource grid is referred to as a resource element. The resource element on the resource grid may be identified by an index pair (k,l) in the slot. Here, k (k=0, ..., $N_{RB} \times 12-1$) is a sub-carrier index in the frequency domain, and l (l=0, ..., 6) is an OFDM symbol index in the time domain.

As an example, one resource block includes seven OFDM symbols in the time domain and twelve subcarriers in the frequency domain, thereby including 7×12 resource elements. However, the number of OFDM symbols or subcarriers in the resource block is not limited thereto. The number of OFDM symbols and the number of subcarriers may vary depending on the length of CP or frequency spacing. For example, in the case of normal CP, the number of OFDM symbols is 7, and in the case of extended CP, the number of OFDM symbols is 6. The number of subcarriers in one OFDM symbol may be selected from among 128, 256, 512, 1024, 1536 and 2048.

Figure 4:
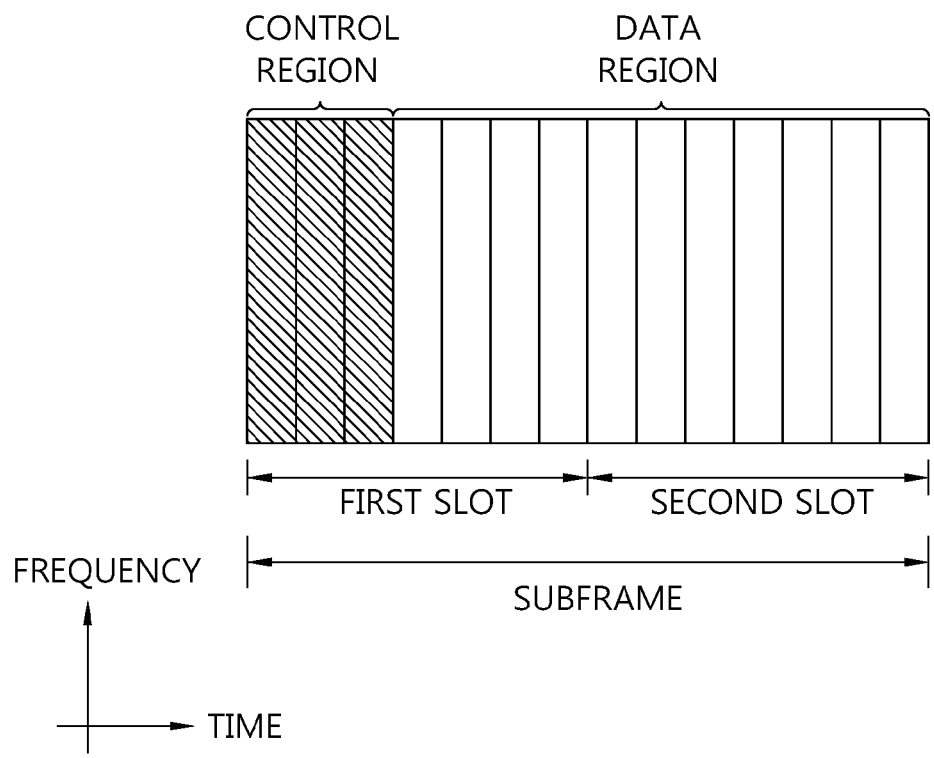
FIG. 4 shows the architecture of a downlink subframe.

FIG. 4 illustrates the architecture of a downlink subframe.

The downlink subframe includes two slots in the time domain, and each slot includes 7 OFDM symbols in the normal CP. In the subframe, the first maximally three OFDM symbols (maximally four OFDM symbols in the bandwidth of 1.4 MHz) in the first slot are a control region to which control channels are assigned, and the remaining OFDM symbols are a data region to which PDSCHs (Physical Downlink Shared Channels) are assigned.

The PDCCH may convey resource allocation of DL-SCH (Downlink-Shared Channel) and transmission format, resource allocation information of UL-SCH (Uplink Shared Channel), paging information over the PCH (paging channel), system information over DL-SCH, resource allocation of an upper layer control message, such as a random access response transmitted over PDSCH, a set of transmission power control (TPC) commands for individual UEs in some UE group, and activation of VoIP (Voice over Internet Protocol). A plurality of PDCCHs may be sent in the control region, and the UE may monitor the plurality of PDCCHs. The PDCCH is transmitted on one or aggregation of several consecutive CCEs (control channel elements). The CCE is a logical allocation unit that is used for providing PDCCH with an encoding rate according to the status of the radio channel. The CCE corresponds to a plurality of resource element groups. Depending on the correlation between the number of CCEs and coding rate provided by the CCEs, the format of the PDCCH and possible bit count of the PDCCH are determined.

The base station determines the PDCCH format depending on a DCI that is to be sent to the UE and adds a CRC (cyclic redundancy check) to control information. The CRC is masked with a unique identifier (RNTI; radio network temporary identifier) depending on the owner or purpose of the PDCCH. In case the PDCCH is for a specific UE, the UE's unique identifier, e.g., C-RNTI (cell-RNTI), may be masked to the CRC. Or, in case the PDCCH is for a paging message, a paging indication identifier, e.g., P-RNTI (paging-RNTI), may be masked to the CRC. In case the PDCCH is for a system information block (SIB), a system information identifier, SI-RNTI (system information-RNTI), may be masked to the CRC. In order to indicate a random access response, which is a response to the UE's transmission of random access preamble, an RA-RNTI (random access-RNTI) may be masked to the CRC.

Figure 5:
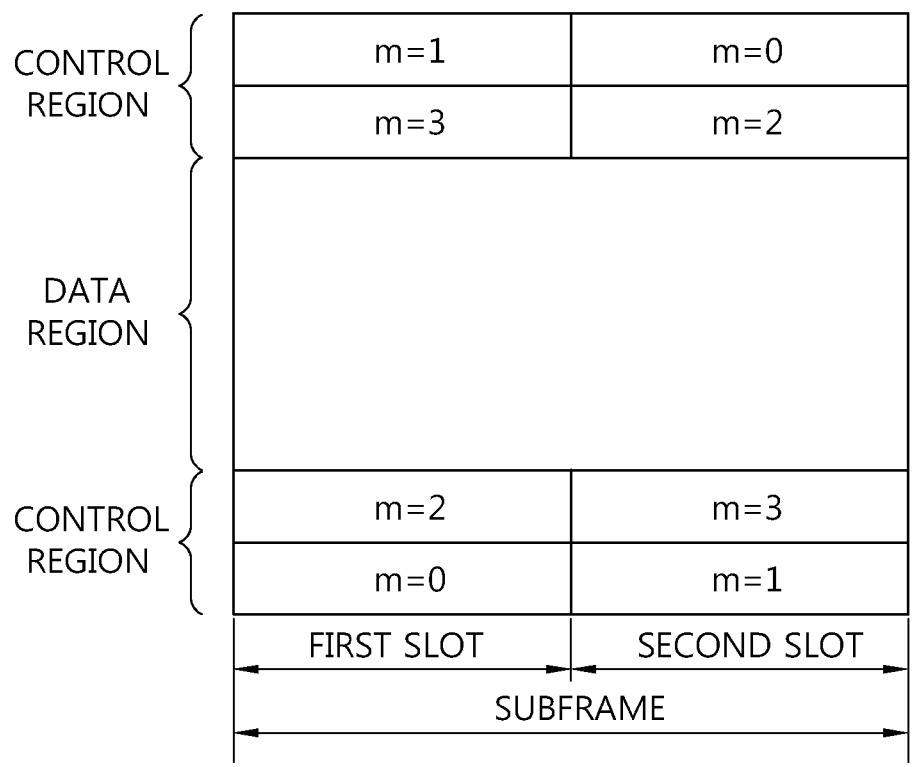
FIG. 5 shows the architecture of an uplink subframe.
Figure 5:
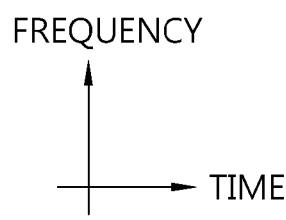

FIG. 5 shows the architecture of an uplink subframe.

The uplink subframe may be separated into a control region and a data region in the frequency domain. The control region is assigned with a PUCCH (physical uplink control channel) for transmitting uplink control information. The data region is assigned with a PUSCH (physical uplink shared channel) for transmitting data. In the case of being indicated at a higher layer, the UE may support simultaneous transmission of the PUSCH and the PUCCH.

The PUCCH for one UE is assigned in a resource block (RB) pair in the subframe. The resource blocks contained in the RB pair occupy different sub-carriers in the first slot and second slot, respectively. The frequency occupied by the resource blocks belonging to the resource block pair assigned to the PUCCH is varied with respect to a slot boundary. This is referred to as the RB pair assigned to the PUCCH being frequency-hopped at the frequency boundary. The UE may send uplink control information through different sub-carriers over time, thus obtaining frequency diversity gain. m is a location index indicating the logical frequency domain location of the resource block pair assigned to the PUCCH.

The uplink control information transmitted over the PUCCH includes HARQ (Hybrid Automatic Repeat reQuest), ACK (Acknowledgement)/NACK (Non-acknowledgement), CQI (Channel Quality Indicator) indicating the status of the downlink channel, SR (Scheduling Request) which is an uplink radio resource allocation request.

The PUSCH is mapped with UL-SCH (Uplink Shared Channel) which is a transport channel. The uplink data transmitted over the PUSCH may be a transport block which is a data block for UL-SCH transmitted during the TTI. The transmission block may be user data. Or, the uplink data may be multiplexed data. The multiplexed data may be data obtained by multiplexing the transmission block for UL-SCH and the control information. For example, the control information multiplied with data may include CQI, PMI (Precoding Matrix Indicator), HARQ, and RI (Rank Indicator). Or, the uplink data may be constituted of control information alone.

In order to enhance performance of a wireless communication system, technology is evolved to obtain higher density of nodes to which users may gain access. A wireless communication system with higher node density may present further enhanced performance thanks to cooperation between the nodes. A wireless communication system containing a plurality of nodes wiredly connected with one base station is referred to as a multi-node system. In the multi-node system, the base station may control the plurality of nodes.

Figure 6:
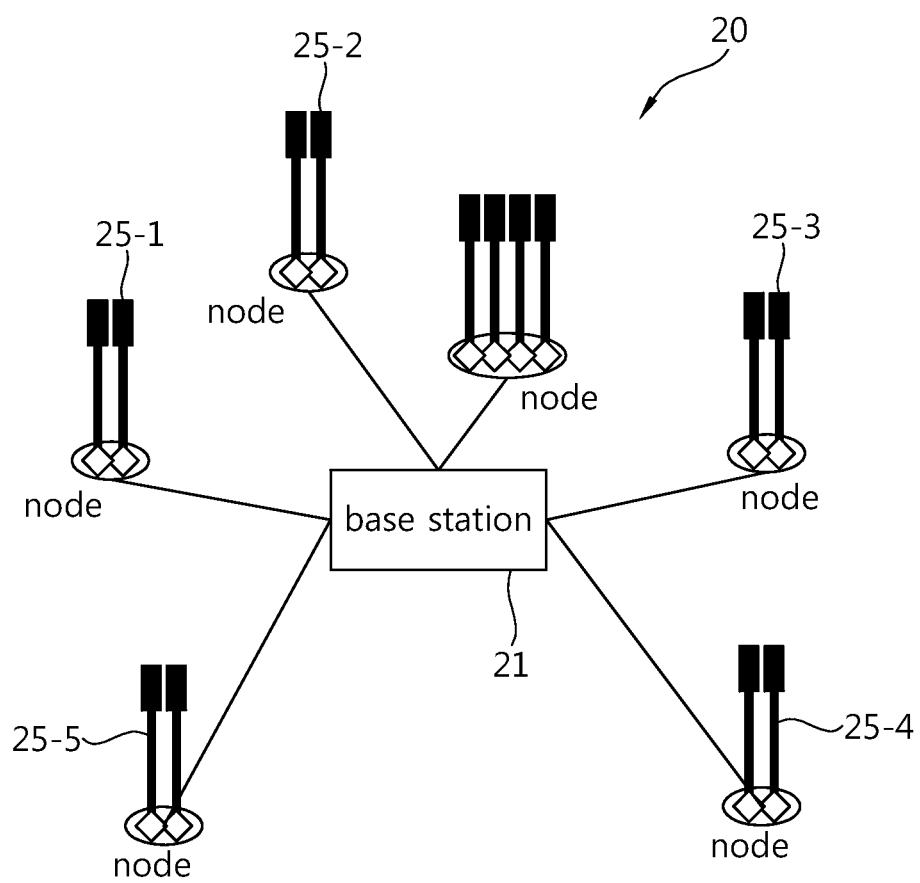
FIG. 6 shows an example multi-node system.

FIG. 6 shows an example multi-node system.

Referring to FIG. 6, the base station 20 may include one base station 21 and a plurality of nodes 25-1, 25-2, 25-3, 25-4, and 25-5. The plurality of nodes 25-1, 25-2, 25-3, 25-4, and 25-5 may be managed by one base station 21. That is, the plurality of nodes 25-1, 25-2, 25-3, 25-4, and 25-5 operate like part of one cell. At this time, each of the nodes 25-1, 25-2, 25-3, 25-4, and 25-5 may be assigned a separate node ID (identifier) or may be operated as some antenna group in the cell without a separate node ID. In such case, the multi-node system 20 shown in FIG. 6 may be considered a distributed multi-node system (DMNS) forming one cell.

Or, the plurality of nodes 25-1, 25-2, 25-3, 25-4, and 25-5 may perform scheduling and handover (HO) on the UE with their respective cell IDs. In this case, the multi-node system 20 shown in FIG. 6 may be considered a multi-cell system. The base station 21 may be a macro cell, and each node may be a femto cell or pico cell having smaller coverage than the cell coverage of the macro cell. As such, in case a plurality of cells are configured to overlay each other depending on coverage, this can be considered a multi-tier network.

In FIG. 6, each of the nodes 25-1, 25-2, 25-3, 25-4, and 25-5 may be any one of a base station, a Node-B, an eNode-B, a pico cell eNb (PeNB), a home eNB (HeNB), an RRH (radio remote head), a relay station (RS; or repeater), and a distributed antenna. At least one antenna may be installed in one node. Further, the node may also be called a point. As used hereinafter, the "node" means an antenna group spaced apart from another at a predetermined distance or more. That is, as used hereinafter, each node is assumed to physically mean an RRH. However, the present invention is not limited thereto, and the node may be defined as any antenna group regardless of the physical distance. For example, a base station comprising a plurality of cross polarized antennas may be deemed to consist of a node comprising horizontal polarized antennas and a node comprising vertical polarized antennas upon application of the present invention. Further, the present invention may apply to when each node is a pico cell or femto cell that has smaller coverage than the macro cell, i.e., multi-cell system. Hereinafter, the term "antenna" may be replaced by an antenna port, virtual antenna, antenna group, as well as refer to a physical antenna.

A reference signal is described.

A reference signal (RS) is generally transmitted in sequence. A reference signal sequence may be any sequence, but is not limited thereto. The reference signal sequence may be a PSK-based computer generated sequence. Examples of the PSK include BPSK (binary phase shift keying) and QPSK (quadrature phase shift keying). Or, the reference signal sequence may be a CAZAC (constant amplitude zero auto-correlation) sequence. Examples of the CAZAC sequence include a ZC (Zadoff-Chu)-based sequence, ZC sequence with cyclic extension, ZC sequence with truncation. Or, the reference signal sequence may be a PN (pseudo-random) sequence. Examples of the PN sequence include an m-sequence, a computer generated sequence, a gold sequence, and a Kasami sequence. Further, the reference signal sequence may be a cyclically shifted sequence.

Downlink reference signals include a cell specific RS (CRS), an MBSFN (multimedia broadcast and multicast single frequency network) reference signal, a UE-specific reference signal, a positioning RS (PRS), and a channel state information reference signal (CSI-RS). The CRS is a reference signal that is sent to all the UEs in a cell and the CRS may be used for channel measurement for CQI (channel quality indicator) feedback and channel estimation for PDSCH. The MBSFN reference signal may be sent in a subframe assigned for MBSFN transmission. The UE-specific reference signal is a reference signal received by a specific UE or specific UE group in a cell and may also be referred to as a demodulation RS (DMRS). The DMRS is mainly used for a specific UE or specific UE group to demodulate data. The PRS may be used for estimating the position of a UE.

The CSI-RS is used for channel estimation for a PDSCH of an LTE-A UE and channel measurement for generating channel information. CSI-RSs are relatively sparsely arranged in the frequency domain or time domain, and may be punctured in the data region of a general subframe or MBSFN subframe. As necessary through CSI estimation, a CQI, PMI and RI may be reported from the UE.

CSI-RSs are transmitted through one, two, four, or eight antenna ports. At this time, the antenna ports used are p=15, p=15, 16, p=15, . . . , 18 and p=15, . . . , 22. That is, CSI-RSs may be transmitted through one, two, four, and eight antenna ports. The CSI-RS may be defined only for a sub-carrier gap $\Delta f=15$ kHz. For the CSI-RS, see 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)," Ch. 6.10.5.

In order to reduce inter-cell interference in a multi-cell environment including a heterogeneous network (HetNet) environment upon transmission of a CSI-RS, up to 32 different configurations may be proposed. The CSI-RS configuration varies depending on the number of antenna ports in the cell and CP, and neighbor cells may have as different configurations as possible. Further, the CSI-RS configurations may be separated into the case which applies to both an FDD frame and a TDD frame and the case which applies only to a TDD frame depending on the frame architecture. A plurality of CSI-RS configurations may be used in one cell. 0 or 1 CSI-RS configuration may be used for a UE assuming a non-zero power CSI-RS, and 0 or several CSI-RS configurations may be used for a UE assuming a zero-power CSI-RS.

A CSI-RS configuration may be indicated by a higher layer. For example, CSI-RS-Config IE (information element) transmitted through a higher layer may indicate a CSI-RS configuration. Table 1 represents an example of CSI-RS-Config IE.

TABLE 1

```
-- ASN1START
CSI-RS-Config-r10 ::=   SEQUENCE {
    csi-RS-r10              CHOICE {
        release                             NULL,
        setup                               SEQUENCE {
            antennaPortsCount-r10               ENUMERATED {an1, an2, an4, an8},
            resourceConfig-r10                  INTEGER (0..31),
```

TABLE 1-continued

```
        subframeConfig-r10                              INTEGER (0..154),
        p-C-r10                                          INTEGER (-8..15)
      }
    }                                       OPTIONAL,              -- Need ON
    zeroTxPowerCSI-RS-r10   CHOICE {
      release                              NULL,
      setup                                SEQUENCE {
        zeroTxPowerResourceConfigList-r10   BIT STRING (SIZE (16)),
        zeroTxPowerSubframeConfig-r10       INTEGER (0..154)
      }
    }                                       OPTIONAL               -- Need ON
  }
}
-- ASN1STOP
```

Referring to Table 1, the 'antennaPortsCount' field indicates the number of antenna ports used for CSI-RS transmission. The 'resourceConfig' field indicates a CSI-RS configuration. The 'SubframeConfig' field and the 'zeroTxPowerSubframeConfig' field indicate subframe configurations where a CSI-RS is transmitted.

The 'zeroTxPowerResourceConfigList' field indicates a zero-power CSI-RS configuration. The CSI-RS configuration corresponding to a bit set as 1 in the 16-bit bitmap configuring the 'zeroTxPowerResourceConfigList' may be set as a zero-power CSI-RS.

$r_{l,n_s}(M)$ for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad [\text{Equation 1}]$$

$$m = 0, \ldots, N_{RB}^{max,DL} - 1$$

where, $c_{init} =$ $$2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1 above, $n_s$ is a slot number in the radio frame, and l is an OFDM symbol number in the slot. c(i) is a pseudo random sequence, and is started at each OFDM symbol with $c_{init}$ denoted in Equation 1. $N_{ID}^{cell}$ means a physical cell ID.

In the subframes configured to send a CSI-RS, the reference signal sequence $r_{l,n_s}(m)$ is mapped with a complex value modulation symbol $a_{k,l}(P)$ that is used as a reference symbol for antenna port p.

The relationship between $r_{l,n_s}(m)$ and $a_{k,l}(P)$ is as follows.

$$a_{k,l}^{(p)} = w_{l''} \cdot r(m) \quad [\text{Equation 2}]$$

where, $$k = k' + 12m +$$

-continued $$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2 above, (k',l') and $n_s$ are given in Tables 2 and 3 to be described below. A CSI-RS may be sent through a downlink slot satisfying the conditions shown in Tables 2 and 3 (here, 'mod' means modular operation. That is, ($n_s$ mod 2) means the remainder obtained by dividing $n_s$ by 2).

Table 2 represents CSI-RS configurations in normal CP, and Table 3 represents CSI-RS configurations in extended CP.

TABLE 2

| | | No. of configured CSI-RSs | | | | | |
|---|---|---|---|---|---|---|---|
| | | 1 or 2 | | 4 | | 8 | |
| | CSI-RS configuration index | (k', l') | $n_s$ mod 2 | (k', l') | $n_s$ mod 2 | (k', l') | $n_s$ mod 2 |
| TDD and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |

TABLE 2-continued

|  | CSI-RS configuration index | No. of configured CSI-RSs | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
|  | 5 | (8, 5) | 0 | (8, 5) | 0 | | |
|  | 6 | (10, 2) | 1 | (10, 2) | 1 | | |
|  | 7 | (8, 2) | 1 | (8, 2) | 1 | | |
|  | 8 | (6, 2) | 1 | (6, 2) | 1 | | |
|  | 9 | (8, 5) | 1 | (8, 5) | 1 | | |
|  | 10 | (3, 5) | 0 | | | | |
|  | 11 | (2, 5) | 0 | | | | |
|  | 12 | (5, 2) | 1 | | | | |
|  | 13 | (4, 2) | 1 | | | | |
|  | 14 | (3, 2) | 1 | | | | |
|  | 15 | (2, 2) | 1 | | | | |
|  | 16 | (1, 2) | 1 | | | | |
|  | 17 | (0, 2) | 1 | | | | |
|  | 18 | (3, 5) | 1 | | | | |
|  | 19 | (2, 5) | 1 | | | | |
| TDD frame | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 | | |
|  | 24 | (8, 1) | 1 | (8, 1) | 1 | | |
|  | 25 | (6, 1) | 1 | (6, 1) | 1 | | |
|  | 26 | (5, 1) | 1 | | | | |
|  | 27 | (4, 1) | 1 | | | | |
|  | 28 | (3, 1) | 1 | | | | |
|  | 29 | (2, 1) | 1 | | | | |
|  | 30 | (1, 1) | 1 | | | | |
|  | 31 | (0, 1) | 1 | | | | |

TABLE 3

|  | CSI-RS configuration index | No. of configured CSI-RSs | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| TDD and FDD frame | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 | | |
|  | 5 | (3, 4) | 0 | (3, 4) | 0 | | |
|  | 6 | (4, 4) | 1 | (4, 4) | 1 | | |
|  | 7 | (3, 4) | 1 | (3, 4) | 1 | | |
|  | 8 | (8, 4) | 0 | | | | |
|  | 9 | (6, 4) | 0 | | | | |
|  | 10 | (2, 4) | 0 | | | | |
|  | 11 | (0, 4) | 0 | | | | |
|  | 12 | (7, 4) | 1 | | | | |
|  | 13 | (6, 4) | 1 | | | | |
|  | 14 | (1, 4) | 1 | | | | |
|  | 15 | (0, 4) | 1 | | | | |
| TDD frame | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 | | |
|  | 20 | (4, 1) | 1 | (4, 1) | 1 | | |
|  | 21 | (3, 1) | 1 | (3, 1) | 1 | | |
|  | 22 | (8, 1) | 1 | | | | |
|  | 23 | (7, 1) | 1 | | | | |
|  | 24 | (6, 1) | 1 | | | | |
|  | 25 | (2, 1) | 1 | | | | |
|  | 26 | (1, 1) | 1 | | | | |
|  | 27 | (0, 1) | 1 | | | | |

The UE may send a CSI-RS only through a downlink slot meeting the conditions of $n_s$ mode 2 in Tables 2 and 3. Further, the UE does not send a CSI-RS through a special subframe of a TDD frame, a subframe where the transmission of the CSI-RS collides with a synchronization signal, PBCH (physical broadcast channel), and system information block type 1 (SystemInformationBlockType1), or a subframe where a paging message is transmitted. Further, in a set S, e.g., S={15}, S={15, 16}, S={17, 18}, S={19, 20} or S={21, 22}, a resource element where a CSI-RS of one antenna port is transmitted is not used for transmission of a PDSCH or CSI-RS of another antenna port.

Table 4 represents an example of the configuration of a subframe where a CSI-RS is transmitted.

TABLE 4

| CSI-RS-SubframeConfig $I_{CSI-RS}$ | CSI-RS period $T_{CSI-RS}$ (subframe) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 4, depending on a CSI-RS subframe configuration ($I_{CSI-RS}$), the period ($T_{CSI-RS}$) and offset ($\Delta_{CSI-RS}$) of a subframe where a CSI-RS is transmitted may be determined. The CSI-RS subframe configuration shown in Table 4 may be any one of the 'ZeroTxPowerSubframe-Config' field or 'SufbrameConfig' field in CSI-RS-Config IE in Table 1. The CSI-RS subframe configuration may be separately configured for a non-zero power CSI-RS and a zero power CSI-RS. Meanwhile, a subframe where a CSI-RS is transmitted needs to satisfy Equation 3. In Equation 3, $n_f$ refers to a system frame number.

$(10n_f+\lfloor n_s/2 \rfloor-\Delta_{CSI-RS})$mod $T_{CSI-RS}=0$ [Equation 3]

Figure 7:
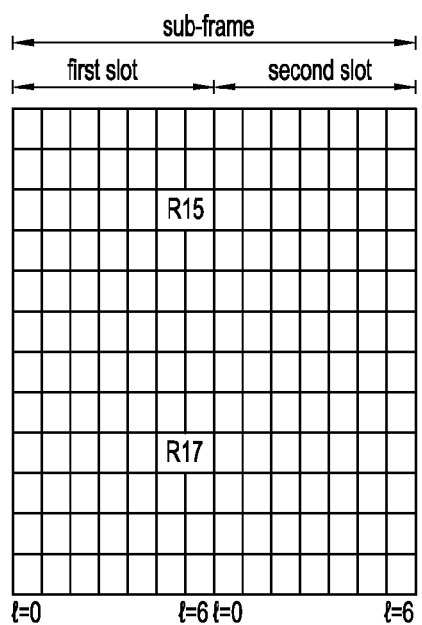
FIG. 7 shows an example RB mapped with a CSI-RS.
Figure 7:
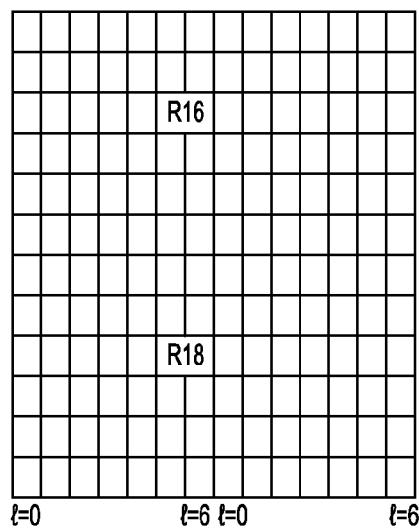
Figure 7:
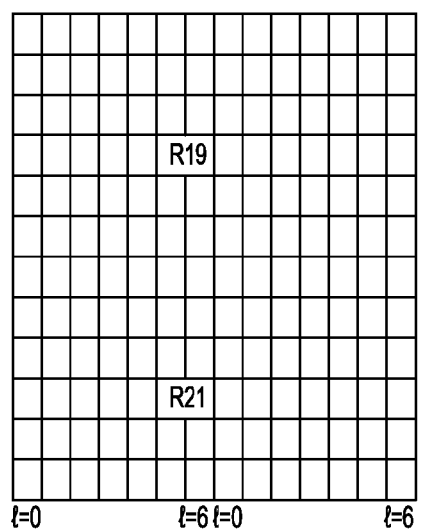
Figure 7:
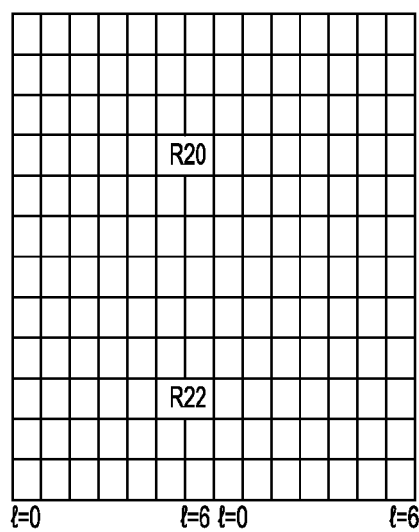

FIG. 7 shows an example of an RB mapped with a CSI-RS.

FIG. 7 illustrates resource elements used for a CSI-RS when in a normal CP architecture, CSI-RS configuration index is 0. Rp refers to a resource element used for CSI-RS transmission on antenna port p. Referring to FIG. 7, a CSI-RS for antenna ports 15 and 16 is transmitted through a resource element corresponding to the third sub-carrier (sub-carrier index 2) in the sixth and seventh OFDM symbols of the first slot (OFDM symbol indexes 5 and 6). A CSI-RS for antenna ports 17 and 18 is transmitted through a resource element corresponding to the ninth sub-carrier (sub-carrier index 8) in the sixth and seventh OFDM symbols (OFDM symbol indexes 5 and 6) of the first slot. A control region for antenna ports 19 and 20 is transmitted through the same resource element as the CSI-RS for antenna ports 15 and 16 is transmitted, and a CSI-RS for antenna ports 21 and 22 is transmitted through the same resource element as the CSI-RS for antenna ports 17 and 18 is transmitted.

If a CSI-RS is transmitted to the UE via eight antenna ports, the UE would receive an RB mapped with R15 to R22. That is, the UE would receive a CSI-RS having a specific pattern.

Figure 8:
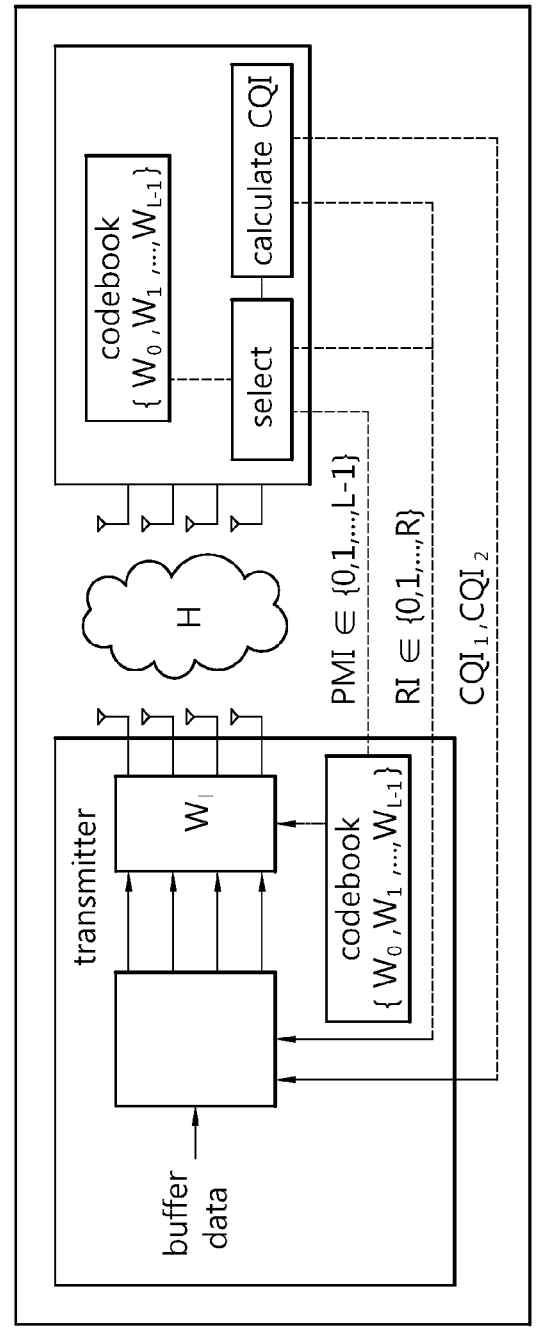
FIG. 8 shows the concept of a CSI feedback.

FIG. 8 shows the concept of CSI feedback.

Referring to FIG. 8, when a transmitter sends a reference signal, for example, a CSI-RS, a receiver measures the CSI-RS and generates a CSI, then feeds it back to the transmitter. The CSI includes a PMI, an RI, a CQI or the like.

The RI is determined by the number of assigned transport layers and is obtained from a related DCI. The PMI applies to closed-loop spatial multiplexing and a large delay CDD. The receiver computes an after-treatment SINR on each PMI for each of rank values 1 to 4, converts it into a sum capacity, and selects the optimal PMI based on the sum capacity. Further, it determines the optimal RI based on the sum capacity. The CQI represents channel quality, and four-bit indexes may be given as in the following table. The UE may feed back the CQI index in the following table.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

Meanwhile, in the multi-node system, the base station may request that each UE measure CSI (channel state information) on neighbor nodes and feed it back. A UE-specifically configured CSI-RS pattern may be a reference for the request.

The CSI-RS pattern means a pattern in which a CSI-RS is mapped in an RB and may refer to a reference signal pattern specified by a CSI-RS configuration index and a CSI-RS subframe configuration index. The UE measures CSI on the configured CSI-RS patterns and feeds it back. However, the CSI-RS pattern(s) in the RB may be the one(s) sent from one node or a plurality of nodes.

Figure 9:
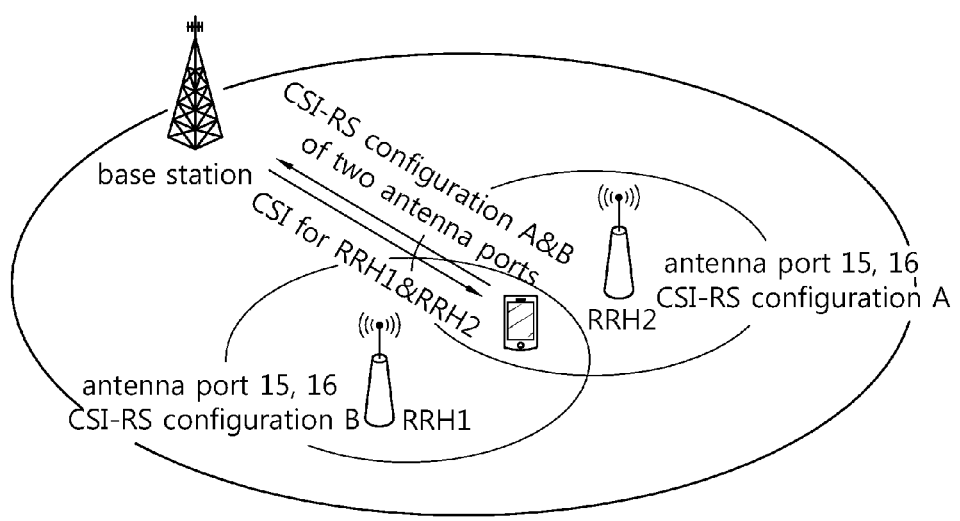
FIG. 9 shows an example of configuring a multi CSI-RS pattern.

FIG. 9 shows an example of configuring multiple CSI-RS patterns.

Referring to FIG. 9, the base station may be configured so that RRH 1 sends a CSI-RS pattern according to CSI-RS configuration B through antenna port 15, 16 and RRH 2 sends a CSI-RS pattern according to CSI-RS configuration A through antenna port 15, 16. That is, it can be configured so that each node uses a different CSI-RS pattern.

The base station may configure, in duplicate, a field indicating each CSI-RS pattern in the CSI-RS configuration information (for example, CSI-RS-Config IE) or expand in the form of a bit string so as to inform the UE that multiple CSI-RS patterns have been configured.

The following table shows an example of conventional CSI-RS-Config IE (information element).

TABLE 6

```
-- ASN1START
CSI-RS-Config-r10 ::=   SEQUENCE {
    csi-RS-r10                          CHOICE {
        release                             NULL,
        setup                               SEQUENCE {
            antennaPortsCount-r10           ENUMERATED {an1, an2, an4, an8},
            resourceConfig-r10                              INTEGER (0..31),
```

TABLE 6-continued

```
            subframeConfig-r10              INTEGER (0..154),
            p-C-r10                         INTEGER (-8..15)
        }
    }                           OPTIONAL,                    -- Need ON
    zeroTxPowerCSI-RS-r10       CHOICE {
        release         NULL,
        setup           SEQUENCE {
            zeroTxPowerResourceConfigList-r10  BIT STRING (SIZE (16)),
            zeroTxPowerSubframeConfig-r10      INTEGER (0..154)
        }
    }                           OPTIONAL                     -- Need ON
}
-- ASN1STOP
```

In Table 6 above, 'csi-RS-r10' represents information on a CSI-RS configuration. For example, 'resourceConfig' refers to a CSI-RS configuration index, and 'subframeConfig' refers to a CSI-RS subframe configuration ($I_{CSI-RS}$). 'p-C' field is a value assumed to be a ratio of PDSCH EPRE (Energy Per Resource Element) and CSI-RS EPRE. Such conventional CSI-RS-Config IE configures one CSI-RS pattern in the UE.

However, in the multi-node system, a plurality of CSI-RS patterns may need to be configured as shown in FIG. 9. Accordingly, several 'csi-RS-r10' fields may be sent in Table 6 so that a plurality of CSI-RS patterns may be configured in the UE.

TABLE 7

```
-- ASN1START
CSI-RS-Config-r 10 ::=    SEQUENCE {
    csi-RS-r10   #1                         CHOICE {
        release                 NULL,
        setup                   SEQUENCE {
            antennaPortsCount-r10   ENUMERATED {an1, an2, an4, an8},
            resourceConfig-r10                  INTEGER (0..31),
            subframeConfig-r10                  INTEGER (0..154),
            p-C-r10                     INTEGER (-8..15)
        }
    csi-RS-r10   #2                         CHOICE {
        release                 NULL,
        setup                   SEQUENCE {
            antennaPortsCount-r10   ENUMERATED {an1, an2, an4, an8},
            resourceConfig-r10                  INTEGER (0..31),
            subframeConfig-r10                  INTEGER (0..154),
            p-C-r10                     INTEGER (-8..15)
        }
    }                           OPTIONAL,                    -- Need ON
    zeroTxPowerCSI-RS-r10       CHOICE {
        release                 NULL,
        setup                   SEQUENCE {
            zeroTxPowerResourceConfigList-r10  BIT STRING (SIZE (16)),
            zeroTxPowerSubframeConfig-r10      INTEGER (0..154)
        }
    }                           OPTIONAL                     -- Need ON
}
-- ASN1 STOP
```

The above method is to duplicately apply a non-zero power CSI-RS pattern configuring method.

Or, as shown in the following table, each field in 'csi-RS-r10,' i.e., 'antennaPortsCount', 'p-C', 'resourceConfig', 'subframeConfig' may be transformed into the form of a bit string, but not in the form of an integer, when a plurality of CSI-RS patterns are configured.

TABLE 8

```
-- ASN1START
CSI-RS-Config-r10 ::=      SEQUENCE {
    csi-RS-r10                             CHOICE {
        release                    NULL,
        setup                      SEQUENCE {
            antennaPortsCount-r11          ENUMERATED {an1, an2, an4, an8},
            resourceConfigList-r11                 BIT STRING (SIZE (32)),
            subframeConfig-r11                             INTEGER (0..154),
            p-C-r10                        INTEGER (-8..15)
        }
    }
                                           OPTIONAL,           -- Need ON
    zeroTxPowerCSI-RS-r10                  CHOICE {
        release                    NULL,
        setup                      SEQUENCE {
            zeroTxPowerResourceConfigList-r10      BIT STRING (SIZE (16)),
            zeroTxPowerSubframeConfig-r10                  INTEGER (0..154)
        }
    }
                                           OPTIONAL            -- Need ON
}
-- ASN1STOP
```

This method is to expand only some fields in the CSI-RS configuration information in the form of a vector so as to cut off signaling overhead when multiple CSI-RS patterns have similar features. For example, multiple CSI-RS patterns configured may differ from each other only in the CSI-RS configuration index but have the same remaining parameters. In such case, only the 'resourceConfig' field may be expanded to the bit string. In the bit string, each bit may be mapped in order with the CSI-RS configuration index. Then, a bit string constituted of up to 32 bits with respect to two antenna port transmission may be needed. If a specific bit in the bit string is not zero, the corresponding CSI-RS configuration index is configured. Excluding a specific CSI-RS configuration index, the length of the bit string might be reduced.

If two or more of the fields in 'csi-RS-r10' are expanded to the bit string, uncertainty may arise in the mapping relationship of each field. For example, assume that two CSI-RS configuration indexes are configured in 'resourceConfig' and two CSI-RS subframe configuration indexes are configured by 'subframeConfig'. In such case, it may be unclear what CSI-RS subframe configuration index is to be mapped with each CSI-RS configuration index.

Accordingly, in case the first field among the fields in 'csi-RS-r10' is expanded in the form of a bit string, the second field corresponding to the first field may be signaled as an integer in an order corresponding to a bit that is not 0 in the first field. Or, it may be signaled as an integer only for a first CSI-RS pattern corresponding to a bit that is the first zero value, and differences from the first CSI-RS pattern may be sequentially signaled for the remaining CSI-RS patterns.

For example, assume that the first field is 'resourceConfig' and the second field is 'subframeConfig.' At this time, it is assumed that the first field is expanded in the form of a bit string, to '0001 0000 0100 0000 0000 1000 0000 0000'. If the leftmost bit corresponds to CSI-RS configuration index 0, and the remaining bits respectively correspond to CSI-RS configuration indexes, 'resourceConfig' is to configure CSI-RS configuration indexes 3, 9, and 20. At this time, assume that the CSI-RS subframe configuration index corresponding to CSI-RS configuration index 3 is I, the cross-carrier scheduling subframe configuration index corresponding to CSI-RS configuration index 9 is J, and the CSI-RS subframe configuration index corresponding to CSI-RS configuration index 20 is M. In such case, I, J, and M may be signaled as integer in 'subframeConfig' Or, I may be signaled as integer, and a difference (J–I or I–J) instead of J and a difference (I–M or M–I) instead of M may be signaled. In the latter case, if the differences are smaller than J and M, signaling overhead may be reduced.

In an implementation example, if a range of the differences is defined to be from −K to K and this is indexed 0 to 2K (i.e., index=difference+K), such index may be signaled in proportion to the number of CSI-RS patterns. Such index is called a subframe configuration difference index (SCDI), for convenience. Then, the first SCDI corresponds to the second non-zero bit of 'resourceConfig,' i.e., CSI-RS configuration index 9, and the second SCDI corresponds to the third non-zero bit, i.e., scheduling information 20.

In the above example, an SCDI is obtained with respect to the first value I, but is not limited thereto. For example, in case CSI-RS configuration indexes are given I, J, and M, SCDIs may be given (I–J) and (J–M). In other words, the first SCDI value may be given as a difference between the first CSI-RS subframe configuration index and the second CSI-RS subframe configuration index, and the second SCDI value may be given as a difference between the second CSI-RS subframe configuration index and the third CSI-RS subframe configuration index. In such case, if the SCDI value is constant (total CSI-RS configuration index-1), only one may be signaled rather than the SCDI value being signaled.

Such method may apply to other fields in 'csi-RS-r10' as well as the 'subframeConfig' field.

The following table represents an example of adding an SCDI after expanding 'resourceConfig' to a bit string.

TABLE 9

```
-- ASN1START
CSI-RS-Config-r10 ::=      SEQUENCE {
    csi-RS-r10                             CHOICE {
```

TABLE 9-continued

```
    release                       NULL,
    setup                         SEQUENCE {
        antennaPortsCount-r11         ENUMERATED {an1, an2, an4, an8},
        resourceConfigList-r11            BIT STRING (SIZE (32)),
        subframeConfig-r11                        INTEGER (0..154),
        p-C-r10                                   INTEGER (-8..15)
        SEQUENCE{□ Size equals to the number of non-zero elements of
resourceConfigList-r11 minus one
            SCDI                          INTEGER (0..2K),    OPTIONAL,
        }
        }
    }
                                  OPTIONAL,               -- Need ON
    zeroTxPowerCSI-RS-r10         CHOICE {
        release                       NULL,
        setup                         SEQUENCE {
            zeroTxPowerResourceConfigList-r10   BIT STRING (SIZE (16)),
            zeroTxPowerSubframeConfig-r10       INTEGER (0..154)
        }
    }
                                  OPTIONAL                -- Need ON
}
-- ASN1STOP
```

In case the UE is configured of two or more CSI-RS patterns, the UE may calculate a CSI for each CSI-RS pattern and feed it back. Such CSI may be called per-CSI-RS pattern CSI. In the multi-node system, a combined CSI for the case where two or more nodes, together, participate in transmission, may need to be fed back, instead of the per-CSI-RS pattern CSI.

For example, in case two 2 antenna port CSI-RS patterns are configured in the UE, the UE, in preparation for the case where a total of four antenna ports together attend data transmission, configures a 4 antenna port channel by combining channels estimated from the two CSI-RS patterns and may then perform CSI measurement and feedback. In other words, after measuring a CSI by applying a codebook corresponding to the combined antenna ports, feedback may need to be done.

According to the prior art, in case an N antenna port codebook is constituted of a total of M precoding matrixes, the UE selects a most preferred matrix among the M precoding matrixes, and depending on the selected matrix, obtains, e.g., RI and CQI, and then feeds the index (PMI) of the matrix, RI, and CQI back to the base station.

However, in the multi-node system, the codebook may be expanded per an arrangement scenario of the nodes. For example, among the M precoding matrixes, M1 precoding matrixes (codebook A) are optimized for a concentrated antenna system, and M2 precoding matrixes (codebook B) may be optimized for a distributed antenna system comprising antennas geographically spaced apart from each other. Here, M=M1+M2.

In case the UE should feed back a combined CSI for multiple CSI-RS patterns, it is efficient to select a precoding matrix, RI, and CQI from codebook B. That is, a PMI may be selected only from codebook B, thus reducing the necessary bit count further than when a PMI is selected from all the codebooks. Further, in case feedback on one CSI-RS pattern is conducted, it may be specified to choose a PMI only from codebook A, but not from all the codebooks.

By using such method, an applicable codebook or candidate precoding matrix varies depending on whether the UE sends feedback on a single CSI-RS pattern or sends feedback on multiple CSI-RS patterns. That is, in accordance with the number of configured CSI-RS patterns, the codebook or candidate precoding matrix which the UE applies to CSI feedback is different.

For example, in case some fields in 'csi-RS-r10' are expanded to a bit string, the CSI measurement and codebook which applies to feedback may vary depending on how many non-zero bits are present in the bit string.

Assume that the base station sends three 'csi-RS-r10's CSI-RS-Config IE. The first 'csi-RS-r10' uses 2 antenna port CSI-RS configuration #0, the second 'csi-RS-r10' uses 2 antenna port CSI-RS configuration #1, and the third 'csi-RS-r10' uses multiple CSI-RS pattern configurations to be able to configure 2 antenna port CSI-RS configuration #0 and 2 antenna port CSI-RS configuration #1 at the same time. That is, the third 'csi-RS-r10' has two non-zero bits in 'resourceConfig' or 'subframeConfig' field represented in a bit string.

The UE measures a PMI, RI, and CQI for each 'csi-RS-r10' field and feeds it back. At this time, upon configuring feedback information on the first 'csi-RS-r10' and the second 'csi-RS-r10' that configures only one CSI-RS pattern, codebook A is utilized, and upon configuring feedback information on the third 'csi-RS-r10' that configures two or more CSI-RS patterns, codebook B may be utilized. The above-described process may be summarized as shown in FIG. 10.

Figure 10:
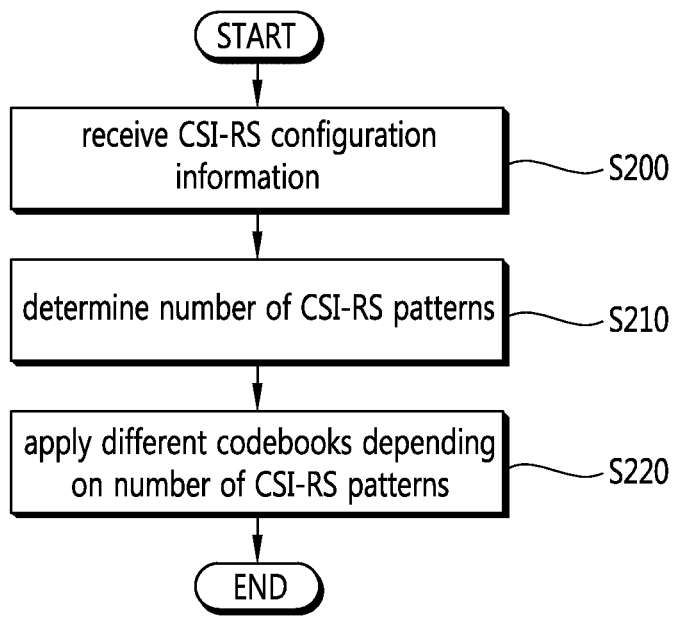
FIG. 10 shows a method of measuring channel information according to an embodiment of the present invention.

FIG. 10 shows a method of measuring channel information according to an embodiment of the present invention.

Referring to FIG. 10, the UE receives CSI-RS configuration information (S200). The UE determines the number of CSI-RS patterns contained in the CSI-RS configuration information (S210), and depending on the number of CSI-RS patterns, applies different codebooks (S220).

Figure 11:
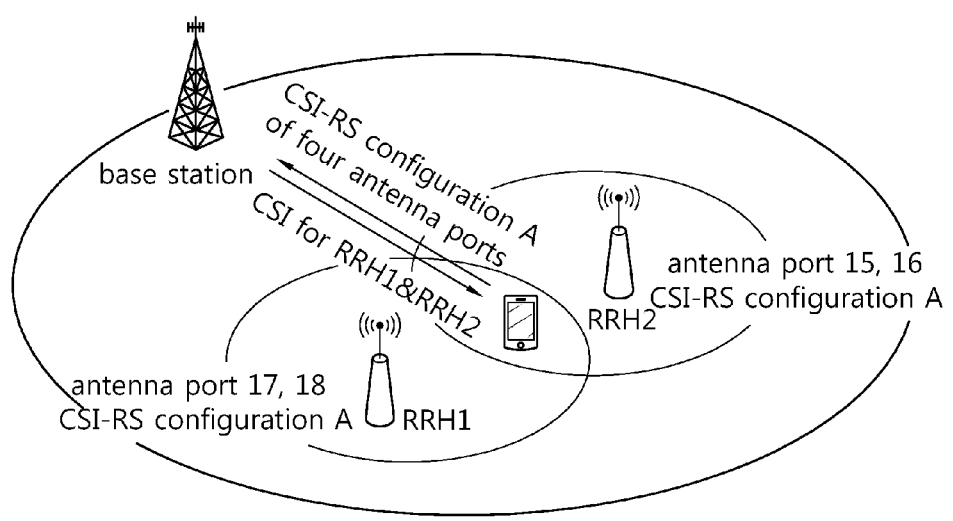
FIG. 11 shows an example of configuring a single CSI-RS pattern in a plurality of nodes.

FIG. 11 shows an example of configuring a single CSI-RS pattern in a plurality of nodes.

Referring to FIG. 11, RRH 1 sends a CSI-RS pattern according to CSI-RS configuration A through antenna port 17, 18, and RRH 2 sends a CSI-RS pattern according to CSI-RS configuration A through antenna port 15, 16. That is, one CSI-RS pattern may consist of CSI-RSs sent from a plurality of nodes. The base station (macro point) may inform the UE that CSI-RS configuration A is sent through four antenna ports.

In such case, although the CSI-RS patterns are the same, it needs to be identified whether one node sends CSI-RSs through four antenna ports or two nodes send CSI-RSs through two antenna ports.

Figure 12:
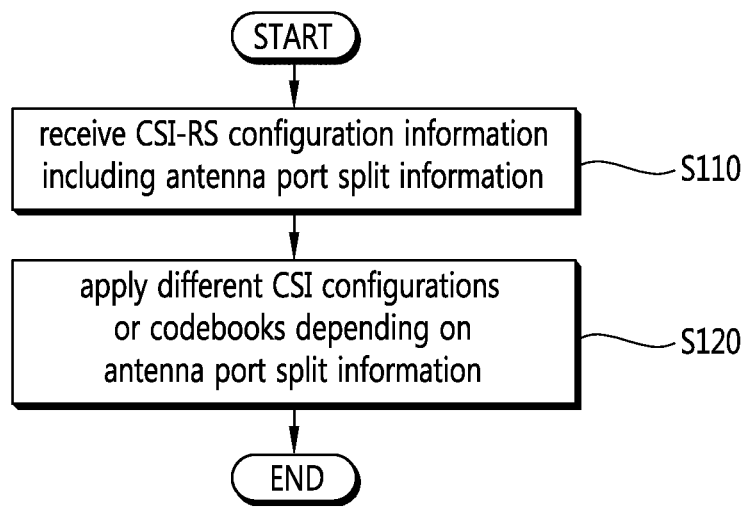
FIG. 12 shows a method of measuring channel information according to an embodiment of the present invention.

FIG. 12 shows a method of measuring channel information according to an embodiment of the present invention.

Referring to FIG. 12, the UE receives CSI-RS configuration information containing antenna port split information (S110). The UE generates channel information by applying different CSI configurations or codebooks depending on the antenna port split information (S120). Each step is described in greater detail.

As shown in FIG. 11, in the multi-node system, a single CSI-RS pattern may be shared by a plurality of nodes. In such case, the base station may inform the UE that the single CSI-RS pattern is shared by the plurality of nodes. For example, the base station may send CSI-RS-Config IE including antenna port split information. The antenna port split information may be implemented in one bit indicating whether antenna ports in the single CSI-RS pattern are split to multiple nodes or one or more bits indicating information on how the antenna ports in the CSI-RS pattern are split.

First, an example of configuring antenna port split information in one bit is described.

suitable for a distributed antenna system, the UE calculated a PMI, RI, and CQI based on codebook A if the 'separation indication' field has 0 and based on codebook B if the 'separation indication' field has 1.

Codebook A and codebook B may be defined as restricted codebooks. For example, all codebooks for the number of corresponding antenna ports may be codebook A, and codebook B may be a codebook defined as a partial set of all the codebooks by signaling indicating codebook restriction information (in the above example, signaling of 'separation indication').

Next, an example where antenna port split information consists of a plurality of bits is described. In such case, the antenna port split information may indicate how the antenna ports in one CSI-RS pattern are split, e.g., as shown in the following table. The antenna port split information serves to indicate a set of antenna ports that are targeted for feedback by a CSI-RS pattern configured by the CSI-RS configuration information.

TABLE 10

```
-- ASN1START
CSI-RS-Config-r10 ::=      SEQUENCE {
    csi-RS-r10                              CHOICE {
        release                                 NULL,
        setup                                   SEQUENCE {
            antennaPortsCount-r10       ENUMERATED {an1, an2, an4, an8},
            separation indication       1 bit
            resourceConfig-r10                      INTEGER (0..31),
            subframeConfig-r10                      INTEGER (0..154),
            p-C-r10                                 INTEGER (-8..15)
        }
    }
                                            OPTIONAL,          -- Need ON
    zeroTxPowerCSI-RS-r10                   CHOICE {
        release                                 NULL,
        setup                                   SEQUENCE {
            zeroTxPowerResourceConfigList-r10       BIT STRING (SIZE (16)),
            zeroTxPower Sub frameConfig-r10         INTEGER (0..154)
        }
    }
                                            OPTIONAL           -- Need ON
}
-- ASN1STOP
```

For example, when a CSI-RS pattern is configured which is sent through N antenna ports, CSI-RS-Config IE may contain a one-bit 'separation indication' field as shown in the above table. In case the 'separation indication' field is 1, the UE may be aware that among the N antenna ports, N/2 antenna ports are transmitted from each of two nodes.

In case the 'separation indication' field is 1, the UE applies a codebook for N/2 antenna port transmission to compute a CQI, RI, and PMI and feeds back two CSI sets. That is, without antenna port split information, the UE would have computed a CSI using a codebook for N antenna port transmission. However, according to the present invention, a codebook for N/2 antenna port transmission is utilized by the antenna port split information to calculate a CSI.

Further, additional information for CoMP transmission, for example, inter-node phase difference for JT, together with the CSI for N/2 antenna ports may be fed back.

Or, it may be specified to feed back a CSI with the same content regardless of the value of the 'separation indication' field, with different codebooks applied. For example, in case there are codebook A suitable for a concentrated antenna system for four antenna port transmission and codebook B

TABLE 11

| separation indication | 1st antenna port set | 2nd antenna port set | 3rd antenna port set | 4th antenna port set |
|---|---|---|---|---|
| 0 | {0, . . . , 7} | — | — | — |
| 1 | {0, . . . , 3} | {4, . . . , 7} | — | — |
| 2 | {0, . . . , 3} | {4, 5} | {6, 7} | — |
| 3 | {0, 1} | {2, 3} | {4, 5} | {6, 7} |

In other words, as shown in Table 11, if the antenna port split information (e.g., separation indication field) is i) 0, all the antenna ports in the CSI-RS pattern belong to the same node, if the antenna port split information is ii) 1, four antenna ports are distributed in two nodes, if the antenna port split information is iii) 2, four antenna ports, two antenna ports, and two antenna ports are distributed in three nodes, and if the antenna port split information is iv) 3, two antenna ports are distributed in four nodes.

As shown in the above table, the UE feeds back a CSI for up to four antenna port sets depending on the 'separation indication' field value. In this case, different codebooks may be utilized according to the antenna port split information.

In other words, in the multi-node system, CSI-RSs in a single CSI-RS pattern may be 1) N antenna port transmission from the same node or 2) K (K<N) antenna port transmission from a plurality of nodes. The base station informs the UE of which is the case between 1) and 2) above through the antenna port split information, so that the UE may generate a CSI using a size-shrunken codebook. Accordingly, the UE's CSI calculation count may be reduced, and an appropriate CSI may be fed back.

Meanwhile, in case a single CSI-RS pattern is transmitted, split per antenna port set, different 'p-C' fields may be applied by the node transmitting each antenna port set. Accordingly, in case 'separation indication' is contained in 'CSI-RS-Config r10,' the 'p-C' field may be signaled per antenna port set, for example, may be transmitted in the form of a bit string or sequence.

Figure 13:
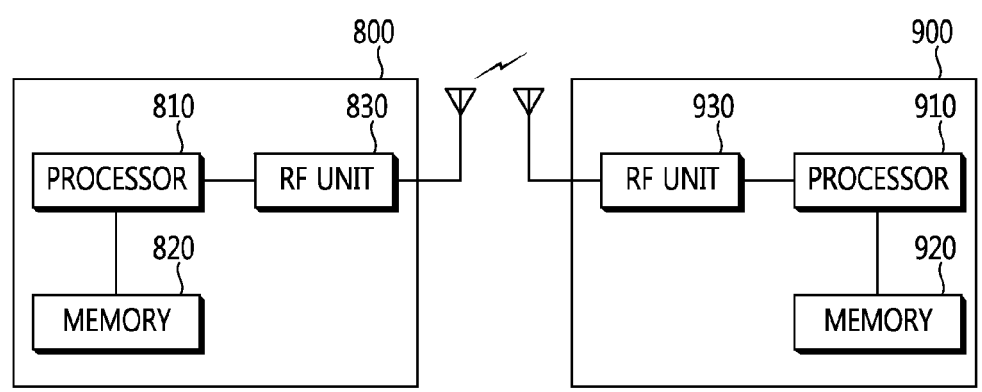
FIG. 13 is a block diagram illustrating a wireless communication system where an embodiment of the present invention is implemented.

FIG. 13 is a block diagram illustrating a wireless communication system in which an embodiment of the present invention is implemented.

A base station 800 includes a processor 810, a memory 820, and an RF (radio frequency) unit 830. The processor 810 implements a function, process, and/or method as suggested herein. The radio interface protocol layers may be implemented by the processor 810. The memory 820 is connected with the processor 810 and stores various pieces of information for driving the processor 810. The RF unit 830 is connected with the processor 810 and transmits and/or receives radio signals.

A UE 900 includes a processor 910, a memory 920, and an RF unit 930. The processor 910 implements a function, process, and/or method as suggested herein. The radio interface protocol layers may be implemented by the processor 910. The memory 920 is connected with the processor 910 and stores various pieces of information for driving the processor 910. The RF unit 930 is connected with the processor 910 and transmits and/or receives radio signals.

The processor 810 or 910 may include an ASIC (application-specific integrated circuit), other chipset, a logic circuit, and/or a data processing device. The memory 820 or 920 may include an ROM (read-only memory), an RAM (random access memory), a flash memory, a memory card, a storage medium, and/or other storage device. The RF unit 830 or 930 may include a baseband circuit for processing radio signals. When an embodiment is implemented in software, the above-described scheme may be realized in a module (process, or function) for conducting the above-described operation. The module may be stored in the memory 820 or 920 and may be executed by the processor 810 or 910. The memory 820 or 920 may be positioned in or outside the processor 810 or 910 and may be connected with the processor 810 or 910 via various well-known means.

Although in the above-described exemplary embodiments, methods are described based on flowcharts having a series of steps or blocks, the present invention is not limited to the order of the steps, and some steps may be conducted in a different order from other steps or simultaneously with the other steps. Further, it may be understood by one of ordinary skill in the art that the steps in the flowcharts do not exclude each other, and rather, other steps may be added thereto or some thereof may be removed therefrom without affecting the scope of the present invention.

What is claimed is:

1. A method of feeding back channel information by a user equipment (UE) in a wireless communication system, the method comprising:

receiving, by the UE, channel state information reference signal (CSI-RS) configuration information including a first indicator and a second indicator, wherein the first indicator indicates whether a number of CSI-RS patterns is one or more than one, and the second indicator indicates whether a plurality of antenna ports are included in a singular node or a plurality of nodes when the first indicator indicates that the number of the CSI-RS patterns is one;

determining a number of CSI-RS patterns based on the first indicator; and generating channel information using a first codebook, a second codebook or a third codebook based on the first indicator and the second indicator, wherein if the first indicator indicates that the number of the CSI-RS patterns is one, and if the second indicator indicates that the plurality of antenna ports are included in a singular node, the channel information is generated based on the first codebook, wherein if the second indicator indicates that the plurality of antenna ports are included in the plurality of the nodes, the channel information is generated based on the second codebook, and wherein if the first indicator indicates that the number of the CSI-RS patterns is more than one, the channel information is generated based on the third codebook.

2. The method of claim 1, wherein when the CSI-RS configuration information configures a plurality of CSI-RS patterns, at least one field of a plurality of fields indicating the plurality of CSI-RS patterns is indicated in the form of a bit string.

3. The method of claim 1, wherein the CSI-RS configuration information includes a first field indicating a CSI-RS configuration index and a second field indicating a subframe where a CSI-RS is transmitted.

4. The method of claim 3, wherein the first field is indicated in the form of a bit string, and each bit in the bit string corresponds to a respective CSI-RS configuration index.

5. The method of claim 4, wherein the second field is given an integer in an order of a CSI-RS configuration index indicated by the bit string.

6. The method of claim 4, wherein in the second field, a value corresponding to a first CSI-RS configuration index among CSI-RS configuration indexes indicated by the bit string is given an integer, and values corresponding to remaining CSI-RS configuration indexes are given with difference values with respect to the integer.

7. A user equipment (UE) for generating and feeding back channel information in a wireless communication system, the UE comprising:

a radio frequency (RF) unit configured to transmit or receive a radio signal; and a processor connected with the RF unit, wherein the processor is configured to:

receive, via the RF unit, channel state information reference signal (CSI-RS) configuration information including a first indicator and a second indicator, wherein the first indicator indicates whether a number of CSI-RS patterns is one or more than one, and the second indicator indicates whether a plurality of antenna ports are included in a singular node or a plurality of nodes when the first indicator indicates that the number of the CSI-RS patterns is one, determine a number of CSI-RS patterns based on the first indicator, and generate channel information using a first codebook, a second codebook or a third codebook based on the first indicator and the second indicator, wherein if the first indicator indicates that the number of the CSI-RS patterns is one, and if the second indicator indicates that the plurality of antenna ports are included in a singular node, the channel information is generated based on the first codebook, wherein if the second indicator indicates that the plurality of the antenna ports are included in the plurality of the nodes, the channel information is generated based on of the second codebook, and wherein if the first indicator indicates that the number of the CSI-RS patterns is more than one, the channel information is generated based on the third codebook.

8. The UE of claim 7, wherein the CSI-RS configuration information includes a first field indicating a CSI-RS configuration index and a second field indicating a subframe where a CSI-RS is transmitted.

9. The UE of claim 8, wherein the first field is indicated in the form of a bit string, and each bit in the bit string corresponds to a respective CSI-RS configuration index.

10. The UE of claim 9, wherein the second field is given an integer in an order of a CSI-RS configuration index indicated by the bit string.

11. The UE of claim 9, wherein in the second field, a value corresponding to a first CSI-RS configuration index among CSI-RS configuration indexes indicated by the bit string is given an integer, and values corresponding to remaining CSI-RS configuration indexes are given with difference values with respect to the integer.

12. The UE of claim 7, wherein when the CSI-RS configuration information configures a plurality of CSI-RS patterns, at least one field of a plurality of fields indicating the plurality of CSI-RS patterns is indicated in a form of a bit string.

* * * * *